US008836962B2

(12) United States Patent
Yasui

(10) Patent No.: US 8,836,962 B2
(45) Date of Patent: Sep. 16, 2014

(54) UNIVERSAL DEVICE DRIVER AND DEVICE CONTROL PROGRAM

(75) Inventor: Ryo Yasui, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 205 days.

(21) Appl. No.: 13/302,433

(22) Filed: Nov. 22, 2011

(65) Prior Publication Data

US 2012/0133967 A1 May 31, 2012

(30) Foreign Application Priority Data

Nov. 26, 2010 (JP) ................................ 2010-264031
Nov. 2, 2011 (JP) ................................ 2011-240889

(51) Int. Cl.
*G06F 3/12* (2006.01)
*G06F 9/44* (2006.01)

(52) U.S. Cl.
CPC ............ *G06F 9/4411* (2013.01); *G06F 3/1205* (2013.01); *G06F 3/1204* (2013.01); *G06F 3/1228* (2013.01); *G06F 3/1285* (2013.01)
USPC ........................................ 358/1.13; 358/1.15

(58) Field of Classification Search
CPC ... G06F 3/1204; G06F 3/1205; G06F 3/1228; G06F 3/1285; G06F 9/4411
USPC ................................................ 358/1.13, 1.15
See application file for complete search history.

(56) References Cited

U.S. PATENT DOCUMENTS

| 5,848,231 | A | * | 12/1998 | Teitelbaum et al. | ............... 726/4 |
| 7,206,091 | B2 | | 4/2007 | Hagiuda | |
| 2005/0105130 | A1 | | 5/2005 | Hagiuda | |
| 2008/0204798 | A1 | | 8/2008 | Taniguchi et al. | |
| 2009/0031330 | A1 | * | 1/2009 | Lee et al. | ....................... 719/327 |
| 2009/0094539 | A1 | | 4/2009 | Wang et al. | |
| 2010/0110491 | A1 | * | 5/2010 | Murase | ........................ 358/1.15 |

FOREIGN PATENT DOCUMENTS

| JP | 04-311243 A | 11/1992 |
| JP | 2005-149094 A | 6/2005 |
| JP | 2008-204389 A | 9/2008 |
| JP | 2009-059363 A | 3/2009 |
| JP | 2009-301312 | 12/2009 |
| JP | 2010-198418 A | 9/2010 |

OTHER PUBLICATIONS

Black Ice Software, "Printer Driver Tips: Multiple Printer Settings", Jan. 2004, vol. 9, Issue 1, Newsletter Archives. Accessed from http://www.blackice.com/Newsletters/NEW30104.*
Notice of Reasons for Rejection issued in corresponding Japanese Patent Application No. 2011-240889 mailed Jan. 17, 2013.
U.S. Appl. No. 13/075,251, filed Mar. 30, 2011.
First Office Action with Search Report issued in corresponding Chinese Patent Application No. 201110378200.7 dated Feb. 20, 2014.

* cited by examiner

*Primary Examiner* — Fred Guillermety
(74) *Attorney, Agent, or Firm* — Banner & Witcoff, Ltd.

(57) ABSTRACT

A logical device registration process and universal device driver are described. Through use of the universal device driver, a device is registered as a logical device and associated with a first user. The registered logical device is then set as a default device for the user. The process may additionally include a default device setting program.

18 Claims, 13 Drawing Sheets

UNIVERSAL DEVICE DRIVER AND DEVICE CONTROL PROGRAM

CROSS REFERENCE TO RELATED APPLICATION

This application claims priority from Japanese Patent Application No. 2010-264031filed on Nov. 26, 2010 and Japanese Patent Application No. 2011-240889 filed on Nov. 2, 2011. The entire contents of each of these priority applications are incorporated herein by reference.

BACKGROUND

1. Technical Field

One or more aspects of the present invention relate to a technology for allowing a plurality of users to share a universal device driver.

2. Description of the Related Art

A universal device driver that can control a plurality of types of devices is known.

Generally, a universal device driver controls a plurality of types of devices as follows. For example, a universal device driver that is executed by an information processing apparatus causes a user to select a device to execute a function from among devices which are connected to the information processing apparatus such that they can communicate with the information processing apparatus. The universal device driver then causes the selected device to execute the function.

Generally, when using a universal device driver to execute a function, it is not necessary that the user select a device every time, and if the user wishes to select the same device as previously selected, the user can cause the same device to execute a function without the need to select the device.

SUMMARY

If a plurality of users share a universal device driver using a signal computer, the following situation may be encountered. A certain user (user A) selects device A to execute a function, and then another user (user B) selects device B to execute a function. Thereafter, the user A again wishes to cause the device A to execute a function.

In this case, if the user A executes a function without selecting the device A because the user A does not know that the control target of the universal device driver has been changed to the device B by the user B, the function is executed with the device B, which was not the intention of the user A.

Accordingly, the present specification discloses one or more techniques for reducing the possibility that a function is executed by devices other than by a device intended by a user when a universal device driver is shared by a plurality of users.

The present specification discloses a universal device driver that is executed in an information processing apparatus using an operating system. The universal device driver causes the information processing apparatus register a device as a logical device with an association with a user and to set the user's default device to that logical device.

It is noted that the universal device driver disclosed above is not restricted to a universal device driver that always registers a logical device when a user has caused a device to execute a function by using the universal device driver.

In another aspect, the present specification discloses a device control program that is executed in an information processing apparatus using an operating system, the device control program including a universal device driver and a default device setting program. The device control program causes the information processing apparatus to register a device as a logical device with an association with a user and to set the user's default device to that logical device. The registration may be executed by one of the universal device driver and the default device setting program, and the setting processing may be performed by the default device setting program.

It is noted that the device control program disclosed above is not restricted to a device control program that always registers a logical device when the user has caused a device to execute a function by using the universal device driver.

The universal device driver disclosed in the specification may be implemented in various modes, such as a device control method, a storage medium storing therein the universal device driver, etc.

The device control program disclosed in the specification may be implemented in various modes, such as a device control method, a device control apparatus, a storage medium storing therein the device control program, etc.

DETAILED DESCRIPTION

It is noted that various connections are set forth between elements in the following description. These connections are described in general and, unless specified otherwise, may be direct or indirect; this specification is not intended to be limiting in this respect.

First Embodiment

A first embodiment of the present invention will be described below with reference to FIGS. 1 through 9.

1. Configuration of Information Processing Apparatus

Figure 1:
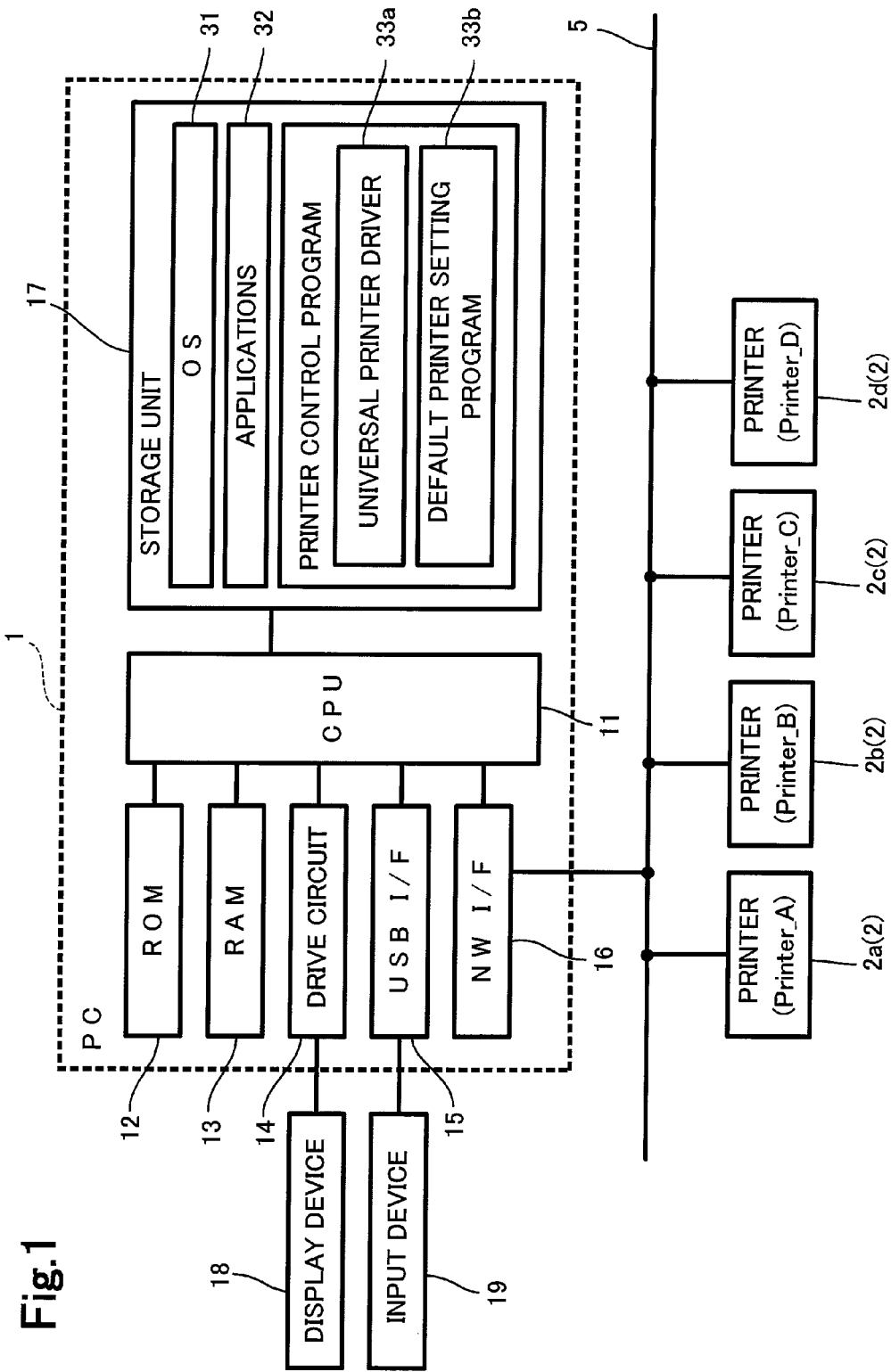
FIG. 1 is a block diagram schematically illustrating the electrical configuration of a personal computer according to a first embodiment.

A personal computer (PC) 1 shown in FIG. 1 includes a central processing unit (CPU) 11, a read only memory (ROM)

12, a random access memory (RAM) 13, a display drive circuit (drive circuit) 14, a universal serial bus (USB) interface (USB I/F) 15, a network interface (NW I/F) 16, and a storage unit 17. It is appreciated that the personal computer PC 1 is just one example of an information processing apparatus with one or more processors. Additional examples include handheld computing devices/tablets, smartphones, internet appliances, and the like. For purposes of explanation, the personal computer PC 1 is used.

The CPU 11 executes various programs stored in the ROM 12 and the storage unit 17 so as to control the individual components of the PC 1. In the ROM 12, various programs and data executed by the CPU 11 are stored. The RAM 13 is used as a primary storage device for the CPU 11 to execute various types of processing.

The display drive circuit 14 is a circuit for driving a display device 18, such as a cathode ray tube (CRT) display, a liquid crystal display, LED display, etc. and is connected to the display device 18 via a cable.

The USB interface 15 is formed as a USB host interface and is connected to an input device 19, such as a mouse or a keyboard, via a USB cable.

The network interface 16 is connected to external devices, such as printers 2, via a communication network 5 such that the network interface 16 can communicate with the external devices.

The storage unit 17 is a device that stores therein various programs and data by use of a non-volatile memory, such as a hard disk or a flash memory.

The storage unit 17 stores therein an operating system (OS) 31, application programs 32 (word processor, spreadsheet software, image editing software, etc.), a universal printer driver 33a (an example of a universal device driver), and a default printer setting driver 33b (an example of a default device setting program).

In this embodiment, as the OS 31, WINDOWS (registered), which is an OS produced by Microsoft Corporation, is used. The OS 31 is not restricted to WINDOWS. Other examples of operating system OS 31 include OS X by Apple Inc. and GOOGLE CHROME OS by Google Inc.

In this embodiment, a plurality of users share the universal printer driver 33a using the PC 1. A user name is assigned to each user, and each user logs in the OS 31 with its user name so as to utilize the universal printer driver 33a.

2. Printer

The plurality of printers 2 (printers 2a through 2d, examples of devices) are devices for forming images on a recording medium, such as paper, according to an electrophotographic system, an ink-jet system, etc. The plurality of printers 2 may be the same type or different types. Hereinafter if the printer 2 is used in a singular form, it means one of the printers 2a through 2d.

3. Logical Printer

It is possible to register logical printers (examples of logical devices) representing the printers 2 in the OS 31.

Figure 2:
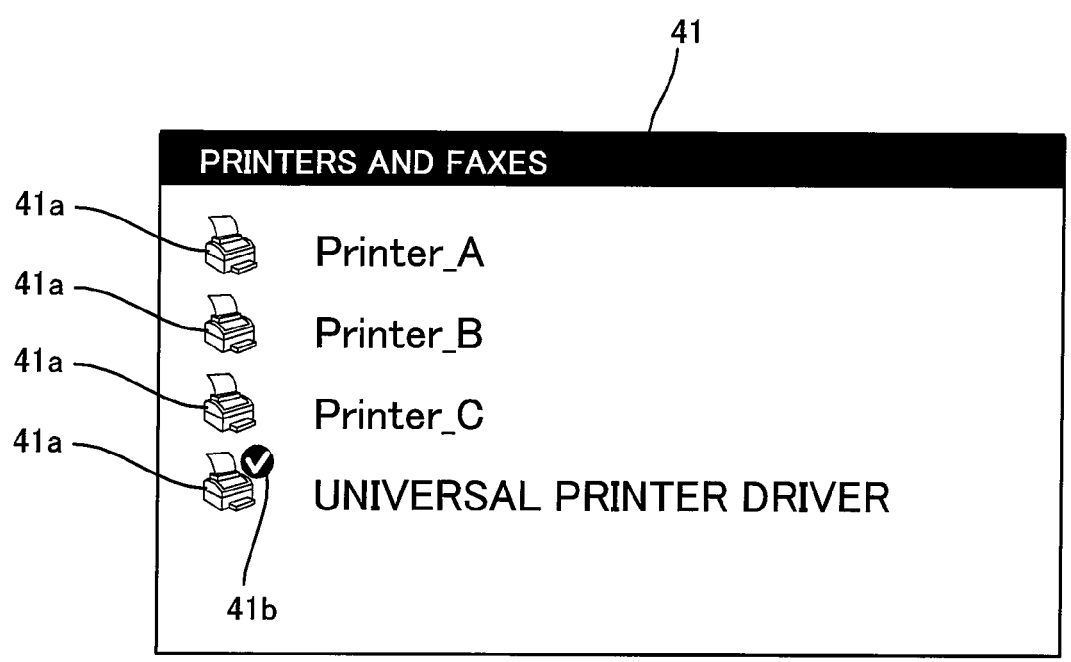
FIG. 2 schematically illustrates an example of a screen in which a list of logical printers is displayed.

FIG. 2 schematically illustrates an example of a screen 41 on which a list of logical printers registered in the OS 31 is displayed. In the case of WINDOWS, the screen 41 on which a list of logical printers is displayed corresponds to a "PRINTERS and FAXES" viewer. The registered logical printers are designated by icons 41a, and also, names assigned to the logical printers are shown.

Printers supported by the universal printer driver 33a are not only one type of printer. Accordingly, in the case of the universal printer driver 33a, as the logical printer corresponding to the universal logical printer 33a, the logical printer representing the universal logical printer 33a itself is registered, and the name indicating the universal logical printer 33a is assigned to that logical printer.

In a logical printer, information concerning a printer driver used for controlling the printer 2 corresponding to the logical printer and the port name of a communication port (for example, a transmission control protocol/Internet protocol (TCP/IP) port or a USB port) used for communicating with the printer 2 are set. The port name specifies the printer 2 represented by the logical printer.

The registration of logical printers may be performed on the "PRINTERS and FAXES" screen 41 by a manual operation performed by a user or by calling an application program interface (API) provided by the OS 31 from a program.

Also, in the OS 31, one of the logical printers may be set for each user as a printer which is normally used by the user (an example of a default printer). The logical printer represented by a printer icon 41a with a check mark 41b is a printer which is set as the default printer (example of a default device) of the user who is currently logging in the OS 31.

The setting of default printers may be performed on the "PRINTERS and FAXES" screen 41 by a manual operation performed by a user or by calling an API provided by the OS 31 from a program.

The logical printer which is set in the OS 31 as the default printer is initially displayed as the printer used for performing printing when the user displays a print screen 50 (see FIG. 3), which will be discussed later.

4. Printer Control Program

As shown in FIG. 1, the universal printer driver 33a and the default printer setting program 33b form a printer control program (an example of a device control program).

The universal printer driver 33a is a low-machine-dependent printer driver that can control a plurality of types of printers. The universal printer driver 33a causes the user to select the printer 2 from among the printers 2 connected to the PC 1 such that the printers 2 can communicate with the PC 1. The universal printer driver 33a then controls the PC 1 so that the PC 1 executes processing for causing the selected printer 2 to perform printing.

Additionally, when the user causes the printer 2 to perform printing by use of the universal printer driver 33a, the universal printer driver 33a registers the logical printer representing the printer 2 in the OS 31, and also controls the PC 1 so that the PC 1 requests the default printer setting program 33b to set the logical printer representing the printer 2 in the OS 31 as the default printer for the user.

The default printer setting program 33b is a program to be executed as a resident program, which is called "service" in the case of WINDOWS and is called "daemon" in the case of UNIX (registered). When the user logs in the OS 31, the default printer setting program 33b determines whether the universal printer driver 33a has requested the default printer setting program 33b to set a default printer for the user. If the universal printer driver 33a is making such a request, the default printer setting program 33b controls the PC 1 that the PC 1 sets the logical printer registered by the universal printer driver 33a as the default printer of the user.

4-1. Universal Printer Driver

Figure 3:
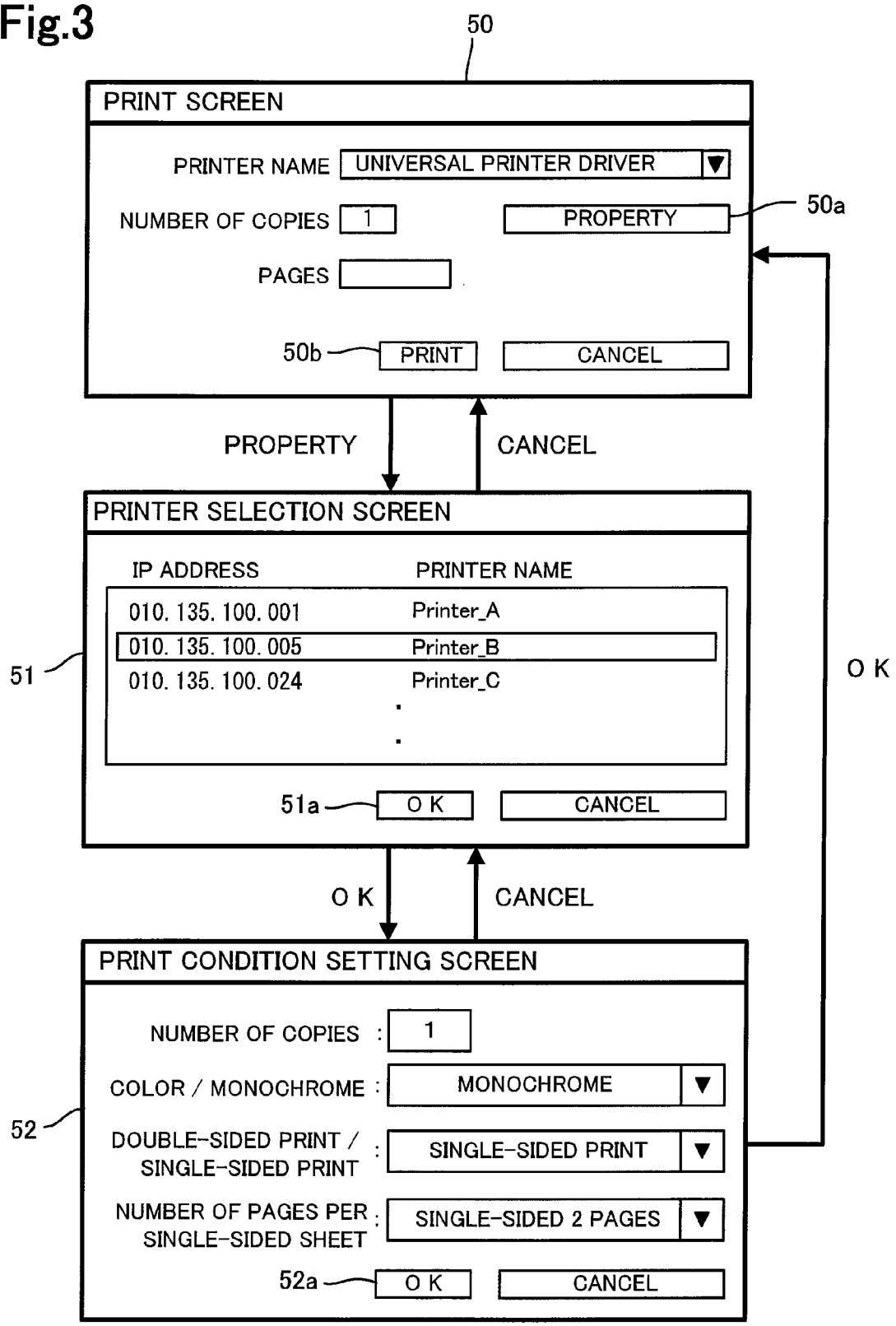
FIG. 3 is a transition diagram illustrating screens displayed when printing is performed by use of a universal printer driver.

FIG. 3 is a transition diagram illustrating screens displayed when printing is performed by use of the universal printer driver 33a.

In this case, it is assumed that the logical printer representing the universal printer driver 33a is set as the default printer for the user who is currently logging in the OS 31.

The CPU 11 executes an application program 32 (hereinafter simply referred to as the "application 32") so as to display a corresponding menu, and the user selects "PRINT" on the menu. Then, the print screen 50 is displayed by the application 32.

As discussed above, the logical printer representing the universal printer driver 33a is set as the default printer for the user who is currently logging in the OS 31. Accordingly, the name of the logical printer representing the universal printer driver 33a is initially displayed in the print screen 50.

In the state in which the universal printer driver 33a is being selected, when the user clicks a "property" button 50a, the universal printer driver 33a is called from the application 32.

Upon being called from the application 32, the CPU 11 that executes the universal printer driver 33a (hereinafter simply referred to as the "universal printer driver 33a") sends data to all the printers 2 connected to the same subnet as the PC 1 by broadcasting. More specifically, the universal printer driver 33a sends data which makes a request for information (IP address, printer name, etc.) for specifying the printer. Then, on the basis of information returned in response to such a request, the universal printer driver 33a searches for the printers 2 connected to the subnet (printers 2 that can be controlled by the universal printer driver 33a).

Then, the universal printer driver 33a displays a printer selection screen 51 in which a list of the names of the printers 2 is displayed.

The user is then able to select one of the printers 2 on the printer selection screen 51. When the user selects one of the printers 2 and clicks an "OK" button 51a, the selected printer 2 is set as the printer 2 to be controlled by the universal printer driver 33a. More specifically, the communication port for communicating with the selected printer 2 is set in the universal printer driver 33a.

The universal printer driver 33a then displays a print condition setting screen 52 for allowing the user to set print conditions. The user is then able to suitably set print conditions on the print condition setting screen 52. When the user clicks an "OK" button 52a on the print condition setting screen 52, the display returns to the print screen 50.

When the user clicks a "PRINT" button 50b, a print instruction is output from the application 32 to the universal printer driver 33a.

Figure 4:
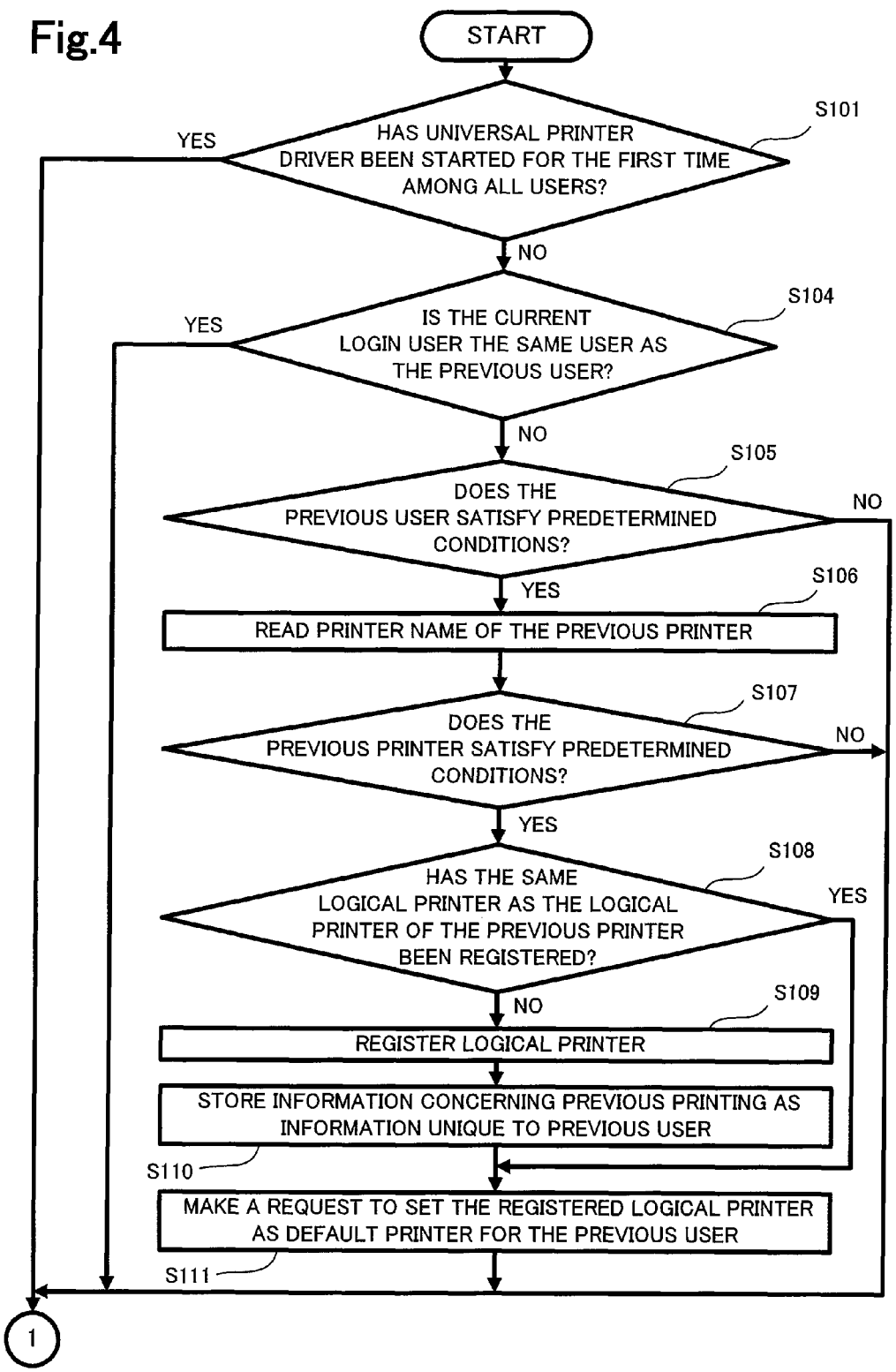
FIGS. 4 and 5 are flowcharts illustrating processing for registering a logical printer and processing for setting a default printer.
Figure 5:
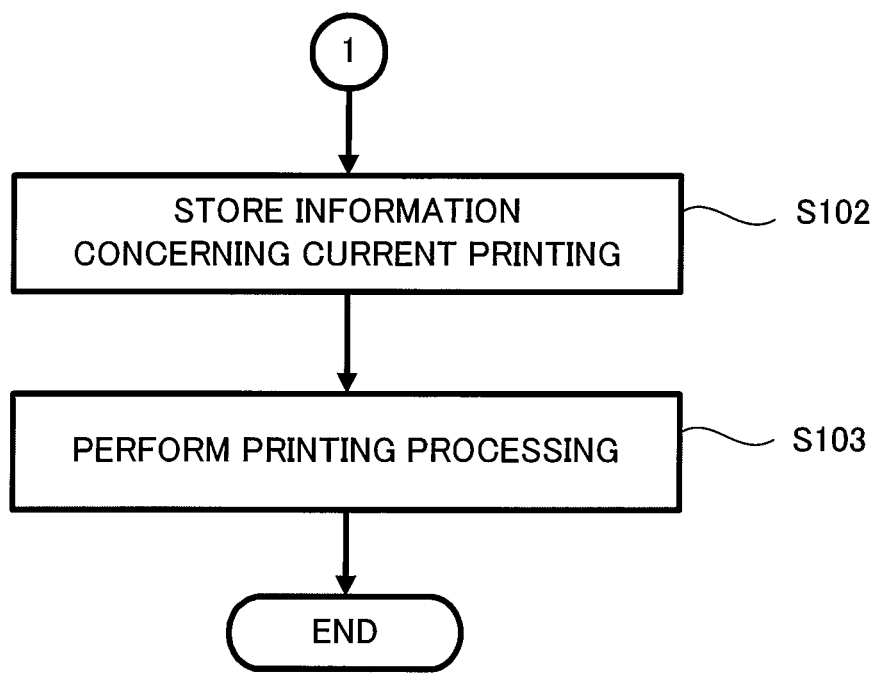

FIGS. 4 and 5 are a flowchart illustrating processing for registering a logical printer (an example of registration processing) and a flowchart illustrating processing for making a request to set a default printer. This processing may be started when a print instruction is output from the application 32 to the universal printer driver 33a after the user has clicked the "PRINT" button 50b on the print screen 50.

This processing may be started when the "OK" button 52a is clicked on the print condition setting screen 52.

A description will now be given of a case where a user (user A) starts the universal printer driver 33a for the first time among all users to cause the printer A to perform printing, and then, another user (user B) logs in to cause the printer 2 to perform printing by use of the universal printer driver 33a.

It is now assumed that the user (user A) starts the universal printer driver 33a for the first time among all users so as to cause the printer A to perform printing.

In S101, the universal printer driver 33a determines whether the universal printer driver 33a has been started for the first time among all users. This determination can be made by making a determination whether "Printing Information" is described in a "MACHINE_DATA" section of a setting storage file 60 (see FIG. 6), which will be discussed later.

If the universal printer driver 33a has been started for the first time among all users, it proceeds to step S102. In contrast, if the universal printer driver 33a has not been started for the first time, it proceeds to step S104. In this example, since the user A has started the universal printer driver 33a for the first time among all users, the universal printer driver 33a proceeds to step S102.

In step S102, the universal printer driver 33a writes information concerning the printing operation this time (hereinafter referred to as the "current printing operation") in the setting storage file 60 (an example of storage processing), which will be discussed below.

Figure 6:
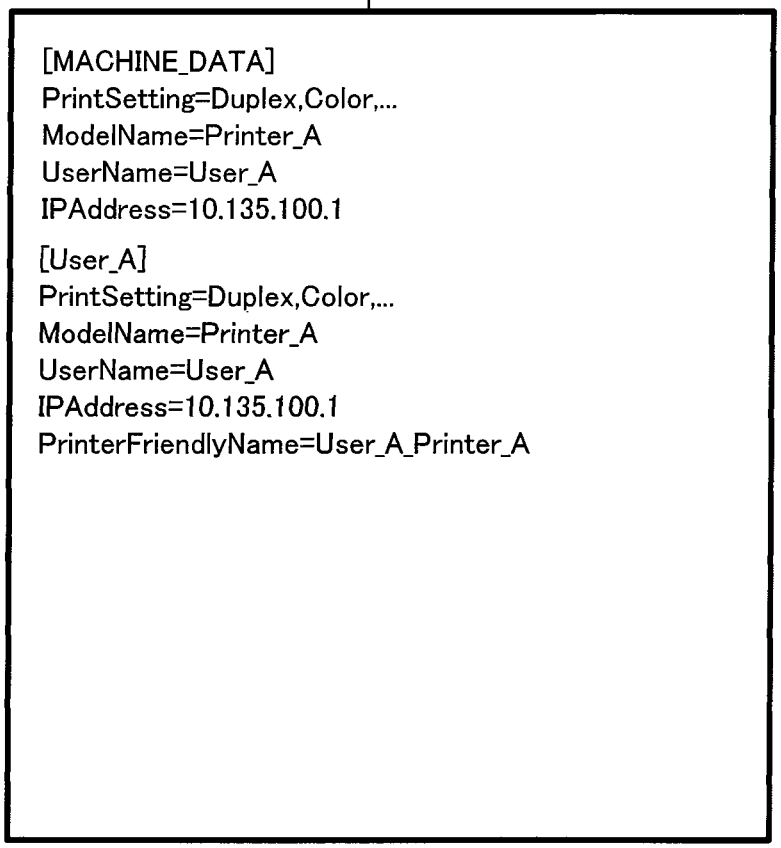
FIG. 6 schematically illustrates an example of a setting storage file.

FIG. 6 schematically illustrates an example of the setting storage file 60. The setting storage file 60 includes the "MACHINE_DATA" section and a "UserName" section.

The "MACHINE_DATA" section is a section in which information concerning the current printing operation is written. The information concerning the current printing operation includes print conditions (PrintSetting) which have been set by the user (user A) who has instructed to perform the printing operation with use of the universal printer driver 33a, the printer name (ModelName) of the printer 2 that has performed the printing operation, the user name of the user (UserName, an example of user ID information), the IP address of the printer 2 (IPAddress) that has performed the printing operation, etc. The printer name and the IP address are examples of device information.

The "UserName" section is a section which is created for each user. The user name of the user is written into "UserName". When the universal printer driver 33a has been started for the first time among all users, no data is written in the "UserName" section. The "UserName" section will be discussed while referring to step S110.

In step S103, the universal printer driver 33a generates a print command on the basis of the print instruction that has been output from the application 32 and the print conditions that have been set on the print condition setting screen 52, and outputs the generated print command to the printer 2 which is set as a control target (which has been selected on the printer selection screen 51). The universal printer driver 33a then completes the processing.

Then, it is assumed that user B logs in to cause printer B to perform printing by use of the universal printer driver 33a. In this case, the result of step S101 is NO, and then, the universal printer driver 33a proceeds to step S104.

In step S104, the universal printer driver 33a determines whether the current login user is the same user as the user who instructed the printer 2 to perform printing by use of the universal printer driver 33a for the previous time (hereinafter such a user is referred to as the "previous user").

More specifically, the universal printer driver 33a reads out the user name from the "MACHINE_DATA" section as the user name of the previous user, and if the user name coincides with the user name of the current login user, the universal printer driver 33a determines that the two users are the same user.

If the current login user is the same as the previous user, the universal printer driver 33a proceeds to step S102. If the current login user is different from the previous user, the universal printer driver 33a proceeds to step S105. In this example, since the user B is different from the user A, the universal printer driver 33a proceeds to step S105.

In step S105, the universal printer driver 33a determines whether the previous user (user A) satisfies predetermined conditions. This will be more specifically described below.

Among users using the universal printer driver 33a, there may be some users who temporarily use the universal printer driver 33a. In this case, if the logical printers for all the users are registered, some logical printers are unnecessarily registered.

Thus, if a user who has instructed the printer 2 to perform printing by use of the universal printer driver 33a is a user that satisfies predetermined conditions, the universal printer driver 33a registers the logical printer representing the printer 2 in the OS 31. If the user is not a user that satisfies predetermined conditions, the universal printer driver 33a does not register the logical printer representing the printer 2 in the OS 31.

In this case, a user that satisfies predetermined conditions is, for example, a user whose user name is registered in the universal printer driver 33a. For example, since a main user of the PC 1 frequently uses the universal printer driver 33a, the user name of the main user of the PC 1 is registered in the universal printer driver 33a. Users other than the main user do not frequently use the universal printer driver 33a, and thus, the user names of such users are not registered in the universal printer driver 33a. It is thus possible to reduce the possibility that unnecessary printers are registered.

The usage history for each user may be recorded, and users who have used the universal printer driver 33a many times or users who have frequently used the universal printer driver 33a for a certain period lately may be users that satisfy predetermined conditions.

If the previous user satisfies predetermined conditions, the universal printer driver 33a proceeds to step S106. If the previous user does not satisfy predetermined conditions, the universal printer driver 33a proceeds to step S102.

In step S106, the universal printer driver 33a reads the printer name (Printer_A) written in the "MACHINE_DATA" section as the printer name of the printer 2 (hereinafter referred to as the "previous printer 2") that has performed printing in response to an instruction of the previous user.

In step S107, the universal printer driver 33a determines whether the previous printer 2 satisfies predetermined conditions. This will be more specifically described below.

Among the printers 2 that have been used, there may be some printers 2 that have been temporarily used. In this case, if the logical printers of all the printers 2 are registered, some logical printers are unnecessarily registered.

Thus, if the previous printer 2 satisfies predetermined conditions, the universal printer driver 33a registers the logical printer representing the previous printer 2 in the OS 31. If the previous printer 2 does not satisfy predetermined conditions, the universal printer driver 33a does not register the logical printer representing the previous printer 2.

A printer that satisfies predetermined conditions may be a printer whose IP address has been directly input and selected by the user on the printer selection screen 51. Although it is not shown in FIG. 3, on the printer selection screen 51, the user can select the printer 2 from the list of the printers 2, and can also directly input the IP address to select the printer 2.

The reason for determining the printer 2 whose IP address has been directly input and selected by the user to be a printer that satisfies predetermined conditions is as follows. The printer 2 which has been selected by the user to take the trouble to input the IP address may be an important printer for the user, and thus, the possibility that the user will use the printer 2 to perform printing is high.

A printer that satisfies predetermined conditions may be a printer that has been used for a certain period lately. It is less likely that a printer that has not been used for a certain period lately will be used again, and thus, if the logical printer of such a printer is registered, it may be unnecessarily registered.

A printer that satisfies predetermined conditions may be a printer that has been used for a certain number of times for a certain period lately (a frequently used printer). It is less likely that a printer which has been used less frequently will be used again, and if the logical printer of such a printer is registered, it may be unnecessarily registered.

If the previous printer 2 satisfies predetermined conditions, the universal printer driver 33a proceeds to step S108. If the previous printer 2 does not satisfy predetermined conditions, the universal printer driver 33a proceeds to step S102.

In step S108, the universal printer driver 33a determines whether the logical printer representing the previous printer 2 has already been registered in the OS 31.

More specifically, the universal printer driver 33a generates a name to be assigned to the logical printer representing the printer 2 according to a predetermined naming convention. For example, the universal printer driver 33a generates a character string (User_A_Printer_A) by connecting the user name (in this case, User_A) of the previous user and the printer name (in this case, Printer_A) of the previous printer with use of "_", and sets the character string as the name of the logical printer.

Then, the universal printer driver 33a determines whether a logical printer having the same name as the generated name (User_A_Printer_A) has already been registered in the OS 31. If such a logical printer has not been registered in the OS 31, the universal printer driver 33a determines that the logical printer representing the previous printer 2 has not yet been registered and proceeds to step S109. If the logical printer representing the previous printer 2 has already been registered, the universal printer driver 33a proceeds to step S111.

Instead of the above-described determination made in step S108, the setting file may be referred to so as to determine whether information written in the "MACHINE_DATA" section coincides with information written in the "UserName" section.

In step S109, the universal printer driver 33a registers the logical printer representing the previous printer 2 in the OS 31 (an example of registration processing for logical devices). In this case, the universal printer driver 33a assigns the name (User_A_Printer_A) generated in step S108 to the logical printer.

In this case, as discussed above, information concerning the printer driver or the port name of the communication port may be set in the logical printer. The universal printer driver 33a sets, in the registered logical printer, information concerning the universal printer driver 33a as the information concerning the printer driver and sets the name of the communication port for communicating with the previous printer 2 as the name of the communication port.

In step S110, the universal printer driver 33a stores information concerning the previous printing operation (printing by the user A).

More specifically, the universal printer driver 33a first creates a "UserName" section for the previous user in the setting storage file 60.

Then, the universal printer driver 33a copies the content of the "MACHINE_DATA" section into the "UserName" section of the previous user.

Then, the universal printer driver 33a writes the name (User_A_Printer_A) of the logical printer registered in step S109 into the logical printer name (PrinterFriendlyName) of the "UserName" section.

"PrintSetting" written in the "UserName" section refers to default print conditions of the logical printer. Accordingly, when the previous user (user A) logs in again to set print conditions on the print condition setting screen 52, the default print conditions set by the previous user (user A) are displayed.

In step S111, the universal printer driver 33*a* requests the default printer setting program 33*b* to set the logical printer registered in step S109 as the default printer of the previous user (user A).

Alternatively, if it is determined in step S108 that the logical printer representing the previous printer 2 has already been registered in the OS 31, the universal printer driver 33*a* requests the default printer setting program 33*b* to set the registered logical printer as the default printer for the previous user (user A).

Such a request may be made in various manners. For example, the user name (User_A) of the previous user and the name (User_A_Printer_A) of the logical printer may be written into a predetermined file (hereinafter referred to as the "setting request file") in association with each other. Alternatively, the API provided by the default printer setting program 33*b* may be called.

In a case where a request is made by writing the user name and the name of the logical printer into the setting request file, if the user name of the previous user has already been written in the setting request file, the name of the logical printer assigned to the user name is overwritten by the name of the new logical printer.

If it is determined in step S104 that the previous user and the current login user are the same user, or if operations in steps S105 through S111 are completed, the universal printer driver 33*a* proceeds to step S102. The "MACHINE_DATA" section is overwritten by information concerning the current printing operation (printing performed by user B).

4-2. Default Printer Setting Program

Figure 7:
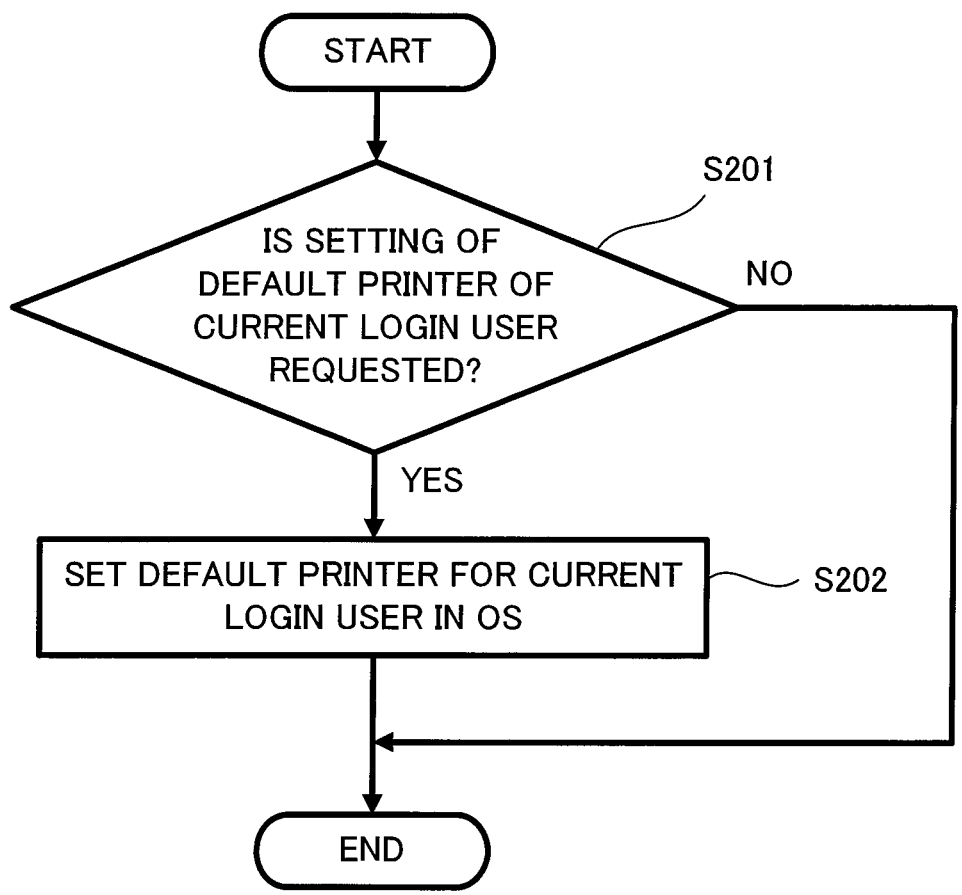
FIG. 7 is a flowchart illustrating processing for setting a default printer.

FIG. 7 is a flowchart illustrating processing for setting a default printer (an example of setting processing). This processing is started when a user logs in the OS 31.

A description will be given below, assuming that the universal printer driver 33*a* has requested the default printer setting program 33*b* to set a default printer by writing a user name and the name of a logical printer into the above-described setting request file.

In step S201, the CPU 11 that executes the default printer setting program 33*b* (hereinafter simply referred to as the "default printer setting program 33*b*") determines whether the default printer setting program 33*b* has been requested to set a default printer for a current login user.

More specifically, for example, if the user name of a current login user is written in the setting request file, the default printer setting program 33*b* determines that the default printer setting program 33*b* has been requested to set a default printer. If the user name of the current login user is not written in the setting request file, the default printer setting program 33*b* determines that such a request has not been made.

For example, if the user A logs in again after the user B has logged off, the user name (User_A) of the user A is written in the setting request file, and thus, the default printer setting program 33*b* determines that the default printer setting program 33*b* has been requested to set a default printer.

If the setting of a default printer is requested, the default printer setting program 33*b* proceeds to step S202. If the setting of a default printer is not requested, the default printer setting program 33*b* completes the processing.

In step S202, the default printer setting program 33*b* reads out the name (User_A_Printer_A) of the logical printer associated with the user name (User_A) of the current login user from the setting request file, and sets the logical printer provided with the name (User_A_Printer_A) in the OS 31 as the default printer for the current login user (user A).

After setting the default printer for the user, the default printer setting program 33*b* may delete the user name of the user and the name of the logical printer associated with the user name from the setting request file.

The default printer has been set as described above.

It is now assumed that the users A, B, and C log in, in this order, to perform printing by using the universal printer driver 33*a*. In this case, when the user C has performed printing by using the universal printer driver 33*a*, a request to set a default printer for the user A and a request to set a default printer for the user B have already been written in the setting request file. In this manner, requests for setting a default printer for a plurality of users can be written in the setting request file.

Then, if the user B logs in after the user C, a default printer is set for the user B prior to the user A. In this manner, the order in which a default printer is set does not necessarily coincide with the order in which the setting of a default printer is requested.

5. Advantages

According to the printer control program of the first embodiment of the present invention, when a user causes the printer 2 to perform printing by using the universal printer driver 33*a*, the OS 31, which can set a default printer for each user, sets the logical printer representing the printer 2 as a default printer for the user.

It is now assumed that after the user A has caused the printer 2*a* to perform printing by using the universal printer driver 33*a*, the user B causes the printer 2*b* to perform printing by using the universal printer driver 33*a*, so that the control target of the universal printer driver 33*a* has been changed from the printer 2*a* to the printer 2*b*.

Figure 8:
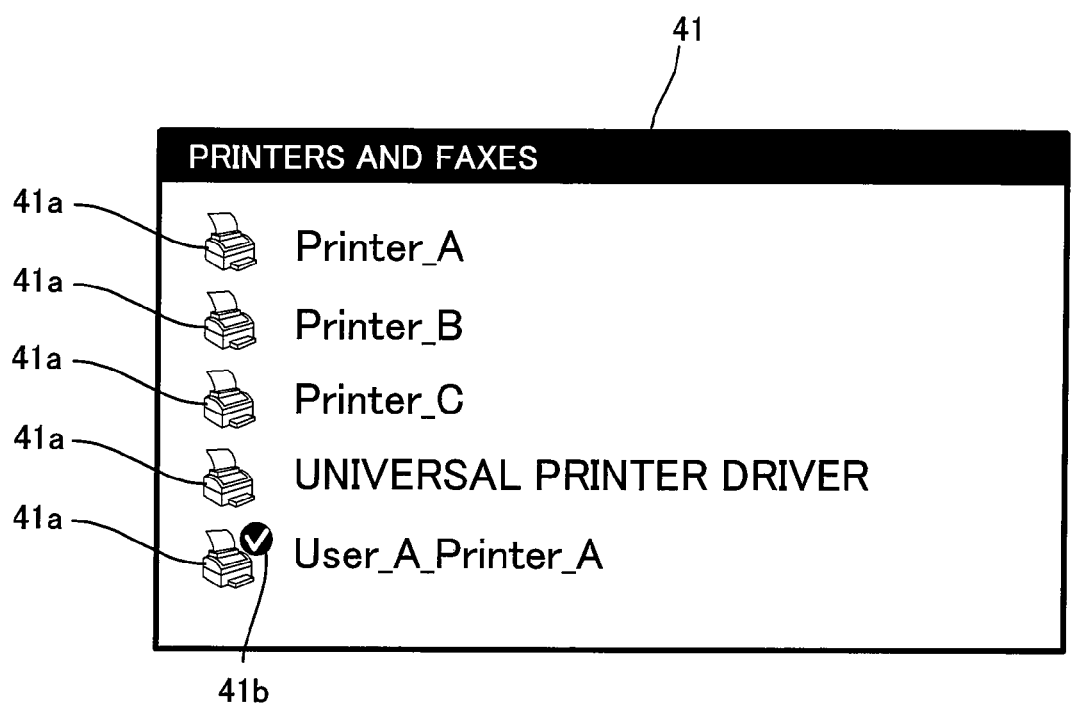
FIG. 8 schematically illustrates an example of a screen in which a list of logical printers is displayed.

In this case, when the user A logs in again, the printer 2*a* that has performed printing for the previous time is set as the default printer for the user A. Accordingly, when the user A displays the "PRINTERS and FAXES" screen 41 after logging in, as illustrated in FIG. 8, the printer icon 41*a* representing the logical printer provided with the name "User_A_Printer_A" is shown, and the printer icon 41*a* is provided with the check mark 41*b* indicating that the logical printer is a default printer.

Figure 9:
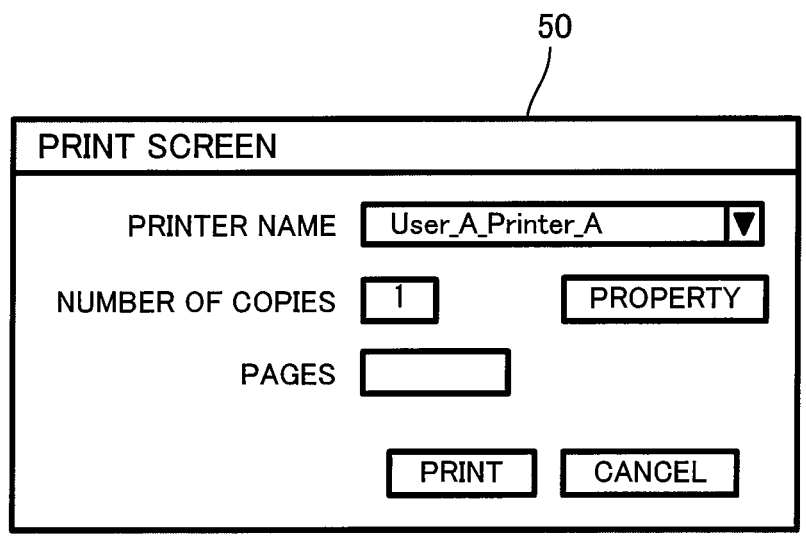
FIG. 9 schematically illustrates an example of a print screen.

When the user A displays the print screen 50, the printer name "User_A_Printer_A" is initially displayed, as shown in FIG. 9, since "User_A_Printer_A" is set as the default printer for the user A. Thus, even if the user A performs printing without selecting the printer 2 on the print screen 50, the user A can cause the printer 2*a* to perform printing as the previous time.

As described above, according to the printer control program of the first embodiment, when a plurality of users share the universal printer driver 33*a*, the possibility that the printers 2 other than the printer 2 intended by a user perform printing can be reduced.

Additionally, according to the printer control program of the first embodiment, even if the user A (an example of a first user) causes the printer 2*a* to perform printing by using the universal printer driver 33*a*, the logical printer representing the printer 2*a* is not registered unless the user B (an example of a second user) causes the printer 2 to perform printing by using the universal printer driver 33*a*. Thus, the possibility that logical printers are unnecessarily registered can be reduced.

Also, according to the printer control program of the first embodiment, when the user A (first user) logs in the OS 31 again, the default printer for the user A is set. This is because the default printer for the user A cannot be set while the user B (second user) is logging in the OS 31, depending on the type of OS 31. With this arrangement, even if the OS 31 is not configured to set the default printer for the user A while the user B is logging in, it is still possible to set the default printer for the user A.

Also, according to the printer control program of the first embodiment, the user name of the user that has caused the printer 2 to perform printing is included in the name of the logical printer. It is thus possible to identify for which user the registered logical printer is set as the default printer.

Also, according to the printer control program of the first embodiment, if the logical printer representing the printer 2 that has caused to perform printing by the user using the universal printer driver 33 has already been registered, it is not registered again. Accordingly, it is possible to inhibit the logical printer representing the same printer from being registered more than once.

Also, according to the printer control program of the first embodiment, if the user that has caused the printer 2 to perform printing by using the universal printer driver 33*a* does not satisfy predetermined conditions, the logical printer representing the printer 2 is not registered in the OS 31. Thus, logical printers are not unnecessarily registered.

Also, according to the printer control program of the first embodiment, if the printer 2 that has performed printing by the user using the universal printer driver 33*a* does not satisfy predetermined conditions, the logical printer representing the printer 2 is not registered in the OS 31. Thus, logical printers are not unnecessarily registered.

Second Embodiment

A second embodiment of the present invention will be described below with reference to FIG. 10.

In the first embodiment, the registration of a logical printer is performed by the universal printer driver 33*a*, and the setting of a default printer is performed by the default printer setting program 33*b*. In the second embodiment, however, the universal printer driver 33*a* performs both registration for a logical printer and setting for a default printer.

Figure 10:
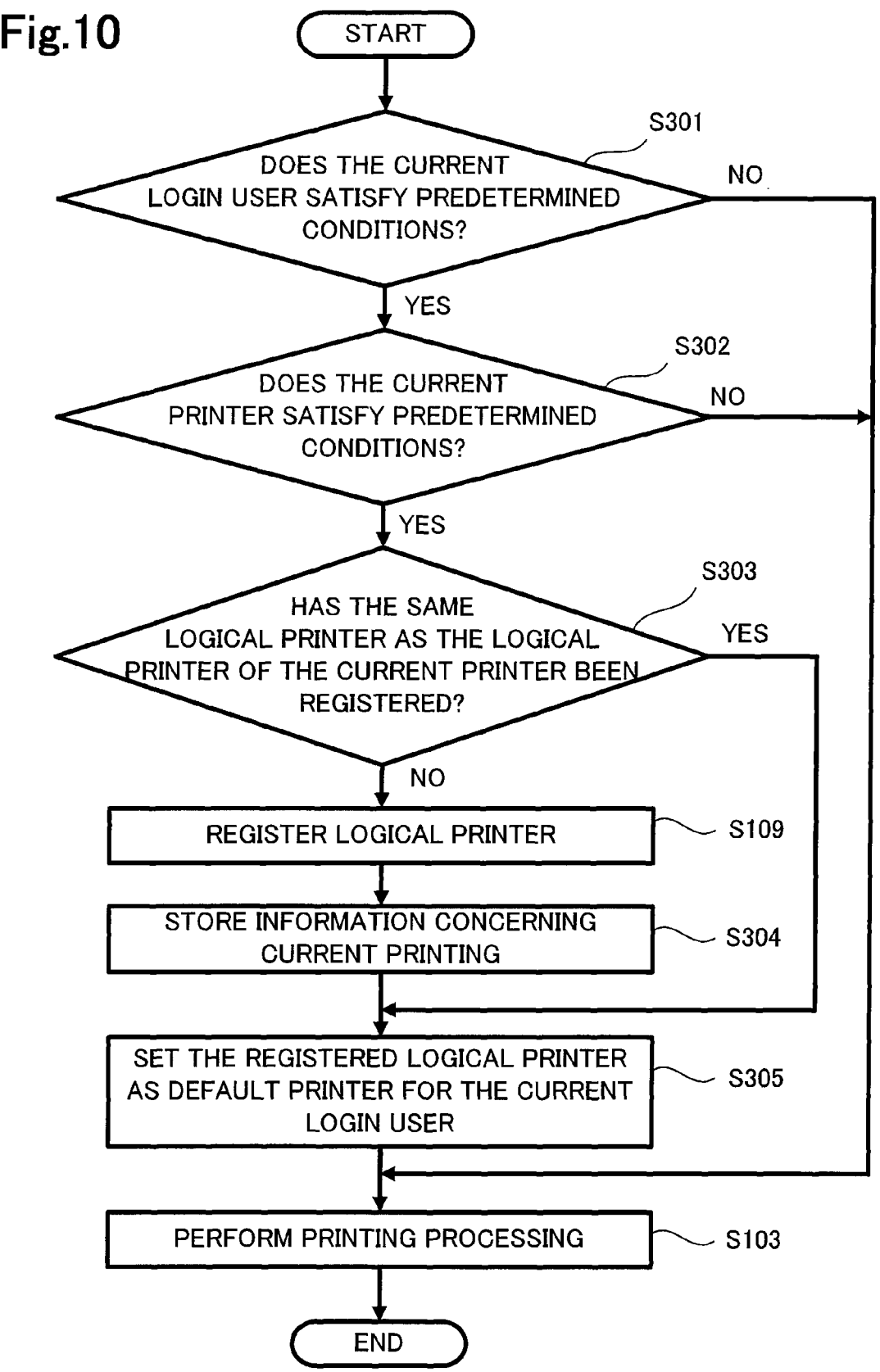
FIG. 10 is a flowchart illustrating processing performed by a universal printer driver according to a second embodiment.

FIG. 10 is a flowchart illustrating processing performed by the universal printer driver 33*a* according to the second embodiment. In FIG. 10, processing operations substantially the same as those in the first embodiment are designated by like step numbers, and an explanation thereof is thus omitted.

In step S301, the universal printer driver 33*a* determines whether a current login user satisfies predetermined conditions. If the user satisfies predetermined conditions, the universal printer driver 33*a* proceeds to step S302. If the user does not satisfy predetermined conditions, the universal printer driver 33*a* proceeds to step S103.

In step S302, the universal printer driver 33*a* determines whether the printer 2 selected by the user satisfies predetermined conditions. If the printer 2 satisfies predetermined conditions, the universal printer driver 33*a* proceeds to step S303. If the printer 2 does not satisfy predetermined conditions, the universal printer driver 33*a* proceeds to step S103.

In step S303, the universal printer driver 33*a* determines whether the logical printer representing the printer 2 selected by the current login user has been registered in the OS 31. If the logical printer has not been registered, the universal printer driver 33*a* proceeds to step S109. If the logical printer has been registered, the universal printer driver 33*a* proceeds to step S305.

In step S304, the universal printer driver 33*a* stores information concerning the current printing operation.

More specifically, for example, the universal printer driver 33*a* writes information concerning the current printing operation into the "UserName" section of the current login user, and the name of the logical printer registered in step S109 into the logical printer name of the "UserName" section.

In the second embodiment, it is not necessary to store information concerning the previous printing operation, and thus, the "MACHINE_DATA" section is substantially unnecessary.

In step S305, the universal printer driver 33*a* sets the logical printer registered in step S109 or, if it is determined in step S303 that the logical printer representing the printer selected by the user has already been registered in the OS 31, sets the logical printer that has been registered in the OS 31 as the default printer for the current login user.

According to the universal printer driver 33*a* of the second embodiment described above, when a plurality of users share the universal printer driver 33*a*, the possibility that printers other than a printer intended by the user execute functions can be reduced.

Additionally, according to the universal printer driver 33*a* of the second embodiment, since both registration of a logical printer and setting of a default printer are performed by the universal printer driver 33*a*, the program configuration can be simplified.

Third Embodiment

A third embodiment of the present invention will be described below with reference to FIG. 11.

Figure 11:
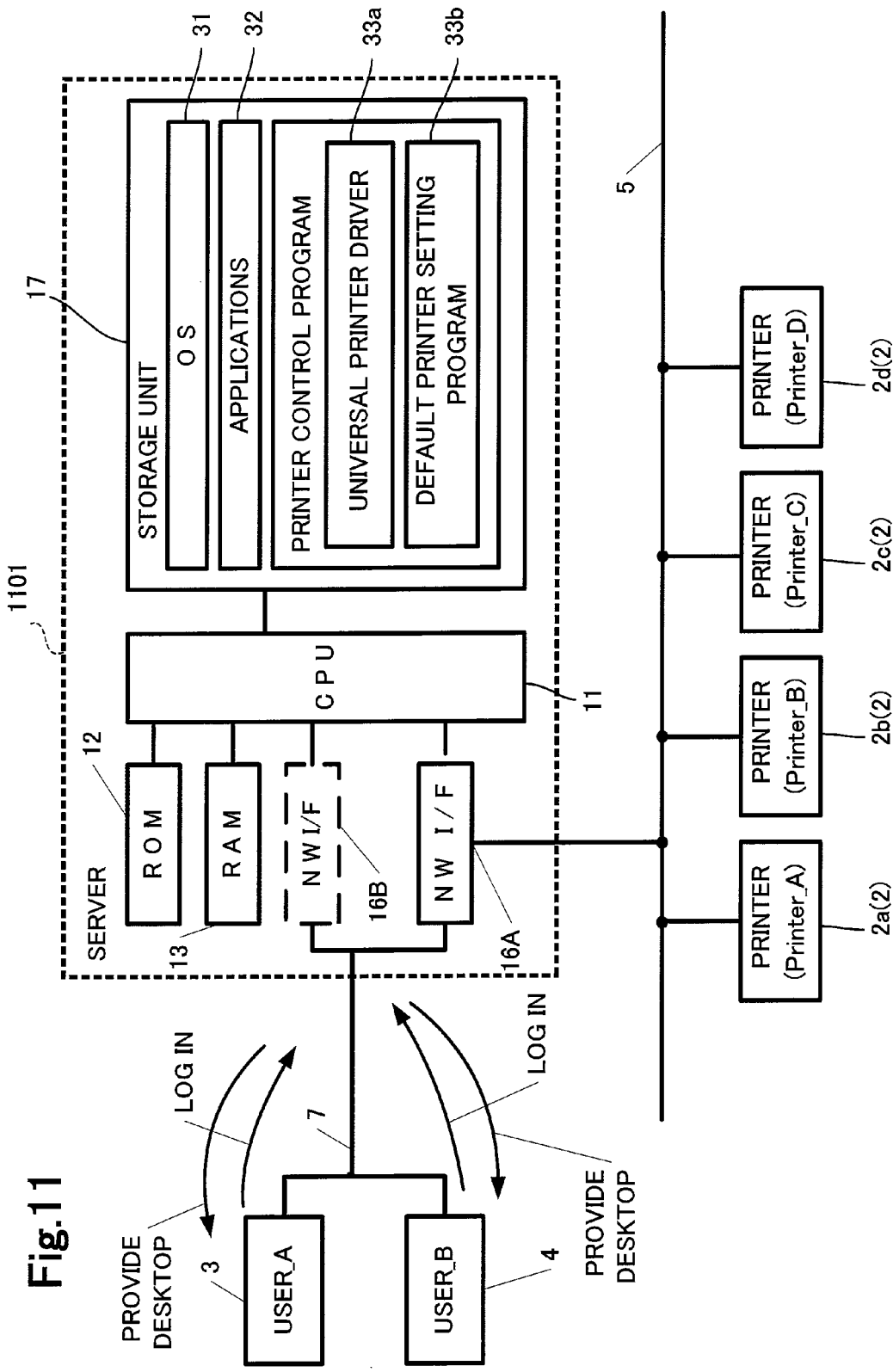
FIG. 11 is a block diagram schematically illustrating the electrical configuration of a personal computer according to a third embodiment.

In FIG. 11, a system similar to that of FIG. 1 is described. Similar elements are represented by common labels. FIG. 11 includes server 1101. Server 1101 connects to User_A 3 and to User_B 4. For each user, the server 1101 provides a remote desktop connection as known in the art (for example, remote desktop applications provided by Citrix Systems, Inc.). Network interfaces 16A and 16B are represented as two different devices. Network interface 16A is shown connecting to communication network 5. Network interface 16B is shown connecting to User_A 3 and User_B 4 via a second communication network 7. Optionally, the network interfaces 16A and 16B may be combined into a single network interface that communicates with both communication network 5 supporting printers 2 and communication network 7 supporting the User_A 3 and User_B 4 devices.

User_A 3 and User_B_4 represent devices providing remote login connections from a first user and a second user. The physical device via which each of the first user and the second user can be a PC as described above or can be any known device through which a remote desktop connection can be established (including, for example, desktops, notebooks, netbooks, PDAs, smartphones, tablet computing devices, net appliances, and related computing devices).

With respect to the User_A 3 device, a user logs into server 1101 (with known authentication procedures) and is provided a remote desktop through which to interact with the OS and applications of server 1101. Similarly, with respect to the User_B 4 device, another user logs into server 1101 (with known authentication procedures) and is provided a remote desktop for that user through which to interact with the OS and applications of server 1101.

In the remote desktop implementations, issues (described above with respect to PC 1) may arise when different users use a common universal printer driver 33*a* to connect to their desired printers. In this third embodiment, the procedures described above in the first and second embodiments may be applied to remote desktop connections provided by server 1101.

The display of the list of logical printers provided in the third embodiment is similar to screen 41 shown in FIG. 8.

Fourth Embodiment

A fourth embodiment of the present invention will be described below with reference to FIG. 12.

Figure 12:
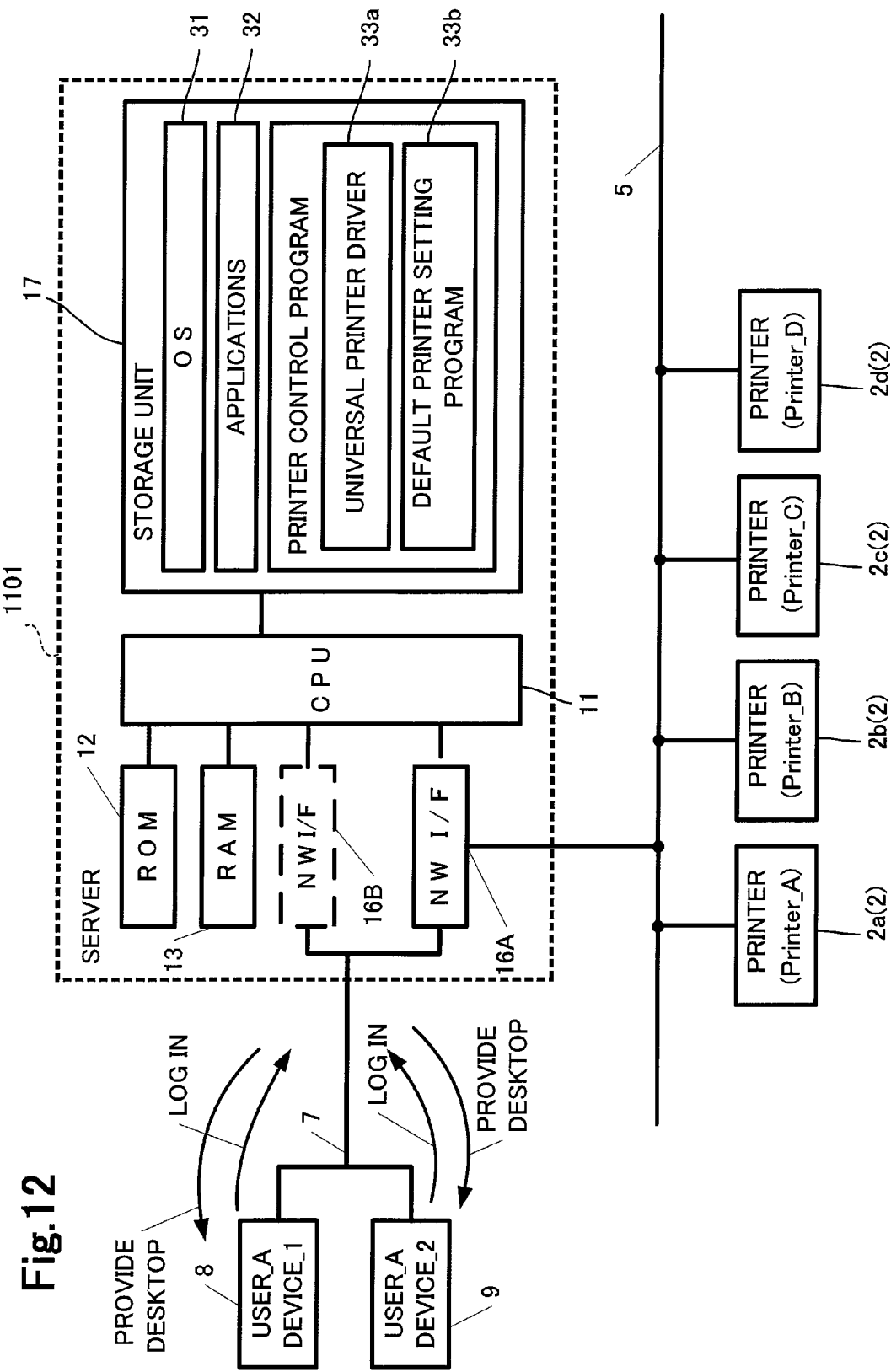
FIG. 12 is a block diagram schematically illustrating the electrical configuration of a personal computer according to a fourth embodiment.

In FIG. 12, a system similar to that of FIG. 1 is described. Similar elements are represented by common labels. FIG. 12 relates to a user logging into server 1101 with different devices.

FIG. 12 includes server 1101. Server 1101 connects to User_A 3 and to User_B 4. For each user, the server 1101 provides a remote desktop connection as known in the art (for example, remote desktop applications provided by Citrix Systems, Inc.).

The two user devices that log into server 1101 are designated as User_A_Device_1 8 and User_A_Device_2 9. The user may log into server 1101 on both devices simultaneously or alternatively, as desired or as restricted by by authentication protocols of server 1101. The physical devices for User_A_Device_1 8 and User_A_Device_2 9 can be PCs as described above or can be any known device through which a remote desktop connection can be established (including, for example, desktops, notebooks, netbooks, PDAs, smartphones, tablet computing devices, net appliances, and related computing devices).

With respect to User_A_Device_1 8, a user logs into server 1101 with a first device (with known authentication procedures) and is provided a remote desktop for that first device through which to interact with the OS and applications of server 1101. Similarly, with respect to User_A_Device_2 9, the users logs into server 1101 with a second device (with known authentication procedures) and is provided a remote desktop for that second device through which to interact with the OS and applications of server 1101.

In the remote desktop implementations, issues (described above with respect to PC 1) may arise when different users use a common universal printer driver 33a to connect to their desired printers. In this fourth embodiment, the procedures described above in the first, second, and third embodiments may be generally applied to remote desktop connections for different devices for a single user provided by server 1101 with the following items. For example, the server 1101 is configured to distinguish between the first and second device of the user. This may be performed, for example, by the server placing a cookie on the user's device (for instance, when using a browser-based plug-in to initiate the remote desktop connection) and subsequently reading the cookie to assign the default printer, obtaining the MAC address of the user's device, and the like. Alternatively or additionally, the device (User_A_Device_1 and User_A_Device_2) may be configured to identify itself to server 1101 based on its own device information in addition to the user ID information (as described with respect to FIG. 6 of the first, second, and third embodiments). Further, the user's login credentials may also include additional credential information to identify from which user device the user is connecting to the remote desktop. For example, the user may be asked to designate a domain (e.g., a standard domain or a domain for mobile devices), a workgroup (e.g., a standard work group or a work group for mobile devices), a separate personal identification number (e.g., a PIN) designating the user's device, and the like.

Further, setting storage file 60 may be modified to include additional information so as to identify the device used by the user (or only to differentiate between the user's devices). This additional information may include one or more of the device's MAC address, the additional user credential login information, and the like.

Figure 13:
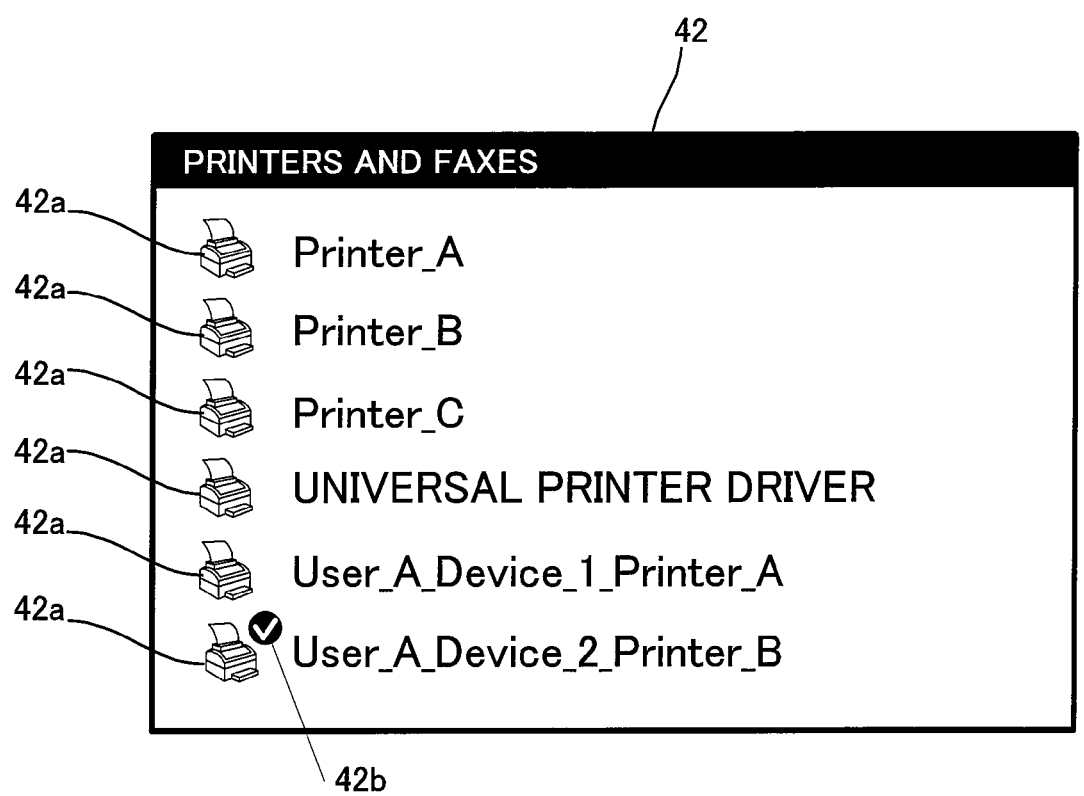
FIG. 13 schematically illustrates an example of a screen in which a list of logical printers is displayed according to the fourth embodiment.

FIG. 13 schematically illustrates an example of a screen in which a list of logical printers is displayed in the fourth embodiment. Here, screen 42 displays a list of logical printers registered in the OS 31. In the case of WINDOWS, the screen 42 on which a list of logical printers is displayed corresponds to a "PRINTERS and FAXES" viewer. The registered logical printers are designated by icons 42a, and also, names assigned to the logical printers are shown. For example, screen 42 lists Printer_A, Printer_B, Printer_C, the universal printer driver, User_A_Device_1_Printer_A, and User_A_Device_2_Printer_B. The default printer is additionally identified by a checkmark 42b. Other operating systems may identify the default viewer differently.

Specifically, with respect to the process of FIGS. 4-5 of the first embodiment applied to the fourth embodiment, step S101 would determine whether the universal printer driver has been started for the first time among all devices among all users. Step S104 would determine whether the current login user device is the same user device as the previous user device. Step S105 would determine whether the previous user device satisfies the predetermined conditions. Step S110 would store information concerning the previous printing as information unique to the previous user device. Step S111 would make a request to set the registered logical printer as the default printer for the previous user device.

Next, with respect to the process of FIG. 7, step S201 would determine if the setting of a default printer for the current login user device has been requested. Step S202 would set the default printer for the current login user device in the OS.

With respect to the process of FIG. 10 of the second embodiment, step S301 would determine whether the current login user device satisfies predetermined conditions. Step S305 would set the registered logical printer as the default printer for the current login user device.

MODIFIED EXAMPLES

Aspects of the present invention are not restricted to the foregoing embodiments described with reference to the accompanying drawings. Various modifications may be made, and, for example, the following modifications may be made, and such modified examples are also included in the scope of the present invention.

First Modified Example

Although in the above-described embodiments the registration of a logical printer is performed by the universal printer driver 33a, it may be performed by the default printer setting program 33b.

For example, when the user A causes a printer to perform printing by using the universal printer driver 33a, the universal printer driver 33a may request the default printer setting program 33b to register the logical printer, and in response to this request, the default printer setting program 33b may register the logical printer in the OS 31.

In this case, while the user A is logging in, the default printer setting program 33b may immediately register the logical printer. Alternatively, when the user B causes a printer to perform printing by using the universal printer driver 33a, the default printer setting program 33b may register the logical printer. Alternatively, when the user A logs in again, the default printer setting program 33b may register the logical printer.

When the user A logs off and the user B causes a printer to perform printing by using the universal printer driver 33a, the universal printer driver 33a may request the default printer setting program 33b to register the logical printer representing the printer 2 that has performed printing by the user A.

In this case, while the user B is logging in, the default printer setting program 33b may immediately register the logical printer. Alternatively, when the user A logs in again, the default printer setting program 33b may register the logical printer.

The universal printer driver 33a may request a program other than the default printer setting program 33b to register the logical printer.

Second Modified Example

In the first embodiment, when the user B causes the printer 2 to perform printing by using the universal printer driver 33a after the user A (first user) has performed printing by using the universal printer driver 33a, the universal printer driver 33a registers the logical printer representing the printer 2. However, even if the user B causes the printer 2 to perform printing by using the universal printer driver 33a, if the printer 2 that has performed printing by the user A is the same printer 2 that has performed printing by the user B, the logical printer representing the printer 2 does not have to be registered. This is because the printer 2, which is the control target of the universal printer driver 33a, has not been changed.

In this case, if for example, the user C causes the different printer 2 to perform printing by using the universal printer driver 33a, the logical printer representing the printer 2 that has performed printing by the user A and the user B may be registered, and a request may be made to set the registered logical printer as the default printer for the user A and the user B.

Third Modified Example

In the foregoing embodiments, information concerning the universal printer driver 33a is set in a registered logical printer. However, if a dedicated printer driver, which has been developed specially for the printer 2 that performs printing by a user using the universal printer driver 33a, is installed in the PC 1, information concerning the dedicated printer driver may be set in the logical printer.

It is now assumed that the user A has caused the printer 2a to perform printing by using the universal printer driver 33a and has logged off, and then, the user A logs in again to click the "PRINT" button 50b without selecting the printer in the print screen 50. In this case, with the above-described modification, the dedicated printer driver is called to cause the printer 2a to perform printing. That is, in this case, too, the user A is able to perform printing by use of the printer 2a that is intended by the user.

Fourth Modified Example

In the foregoing embodiments, if the user is not a user that satisfies predetermined conditions, the logical printer representing the printer used by the user is not registered in the OS 31. However, regardless of whether the user is a user that satisfies predetermined conditions, the logical printer representing the printer used by the user may be registered in the OS 31.

Fifth Modified Example

In the foregoing embodiments, if the printer is not a printer that satisfies predetermined conditions, the logical printer representing the printer is not registered in the OS 31. However, regardless of whether the printer is a printer that satisfies predetermined conditions, the logical printer representing the printer may be registered in the OS 31.

Sixth Modified Example

In the first embodiment, if a logical printer provided with the same name as the generated name has already been registered in the OS 31, that logical printer is not registered, and the already registered logical printer is set as the default printer.

Additionally, even if the name provided for a logical printer is different from the generated name, if the logical printer representing the same printer as the printer specified by the printer name read in step S106 has already been registered, that logical printer does not have to be registered, and the already registered logical printer may be set as the default printer. Accordingly, it is possible to inhibit the logical printer representing the same printer 2 from being registered more than once.

Seventh Modified Example

In the foregoing embodiments, devices have been described through illustration of printers by way of example. However, the devices may be fax machines or so-called multifunction printers having copying functions, print functions, scan functions, etc.

Eighth Modified Example

In the third embodiment, the information collected and stored in user setting file 60 is device-independent. For instance, the user can log into server 1101 using any device and its login credentials are used by server 1101 to set the default printer. Alternatively, the third and fourth embodiments may be combined such that all users' information stored in setting file 1101 may be device-dependent and user-dependent. Here, the default printer would be based on any given user's device (similar to that of the fourth embodiment) but also applied across all users.

What is claimed is:

1. A non-transitory storage medium storing therein a universal device driver that is configured to be executed in an information processing apparatus using an operating system useable by a first user and a second user, wherein the information processing apparatus is configured to communicate with a first device and a second device, and the universal device driver, when executed, causes the information processing apparatus to:

receive a first request from the first user, the first request representing designation of the first device;

after receiving the first request from the first user, register a first logical device associated with the first device represented in the first request from the first user;

set the registered first logical device as a default device for the first user in the operating system;

receive a second request from the second user, the second request representing designation of the second device;

after receiving the second request from the second user, register a second logical device associated with the second device represented in the second request from the second user; and set the registered second logical device as a default device for the second user in the operating system.

2. The non-transitory storage medium according to claim 1, wherein, when the first user satisfies predetermined conditions, the first logical device representing the first device is registered in the operating system.

3. The non-transitory storage medium according to claim 1, wherein, when the first device satisfies predetermined conditions, the first logical device associated with the first user representing the first device is registered in the operating system.

4. The non-transitory storage medium according to claim 1, wherein a name including identification information concerning the first user is provided for the first logical device.

5. The non-transitory storage medium according to claim 1, wherein the universal device driver further causes the information processing apparatus to:
  determine whether another request from the first user represents designation of the first device; and
  when it is determined that the another request represents the designation of the first device, set the first logical device as the default device for the first user.

6. The non-transitory storage medium according to claim 1, wherein the universal device driver includes at least one of a printing function, a scanning function, and a faxing function.

7. The non-transitory storage medium according to claim 1, wherein the first logical device is registered in association with the first device and the universal device driver.

8. The non-transitory storage medium according to claim 1, wherein the second logical device is registered in association with the second device and the universal device driver.

9. The non-transitory storage medium according to claim 1, wherein the first logical device is registered in association with the first device and a first dedicated device driver for the first device.

10. The non-transitory storage medium according to claim 1, wherein the second logical device is registered in association with the second device and a second dedicated device driver for the second device.

11. The non-transitory storage medium according to claim 1,
  wherein the universal device driver causes the information processing apparatus to:
  determine, after receiving the first request from the first user, whether the first logical device associated with the first device has previously registered in the operating system; and
  when it is determined that the first logical device associated with the first device has previously registered, set the registered first logical device as the default device for the first user.

12. The non-transitory storage medium according to claim 1,
  wherein the universal device driver causes the information processing apparatus to:
  store in a storage unit, when receiving the first request from the first user, first device information concerning the first device;
  register in the operating system, when receiving the second request from the second user different from the first user after the first user logged off from the operating system, the first logical device associated with the first device indicated by the device information stored in the storage unit; and
  set the registered first logical device as the default device for the first user when the first user has logged in the operating system again after the first user logged off from the operating system.

13. A non-transitory storage medium storing therein a device control program that is configured to be executed in an information processing apparatus using an operating system useable by a first user and a second user, the device control program including a universal device driver and a default device setting program, wherein the information processing apparatus is configured to communicate with a first device and a second device, and the device control program, when executed, causes the information processing apparatus to:
  receive a first request from the first user, the first request representing designation of the first device;
  after receiving the first request from the first user, register a first logical device associated with the first device represented in the first request from the first user, the registration being executed by one of the universal device driver and the default device setting program; and
  set the registered first logical device as a default device for the first user in the operating system, the setting being performed by the default device setting program;
  receive a second request from the second user, the second request representing designation of the second device;
  after receiving the second request from the second user, register the second device as a second logical device associated with the second device represented in the second request from the second user the registration being executed by one of the universal device driver and the default device setting program; and
  set the registered second logical device as a default device for he second user in the operating system, the setting being performed by the default device setting program.

14. The non-transitory storage medium according to claim 13,
  wherein the device control program causes the information processing apparatus to:
  store in a storage unit, when receiving the first request from the first user, first device information concerning the first device; and
  register in the operating system, when receiving the second request from the second user different from the first user after the first user logged off from the operating system, the first logical device associated with the first device indicated by the first device information stored in the storage unit, and
  wherein the default device setting program causes the information processing apparatus to set the registered first logical device as the default device for the first user when the first user has logged in the operating system again after the first user logged off from the operating system.

15. The non-transitory storage medium according to claim 13,
  wherein the registration is executed by the default device setting program;
  wherein the universal device driver requests the default device setting program to register in the operating system the first logical device and the second logical device representing the first device and the second device respectively; and
  wherein, in response to the request from the universal device driver, the default device setting program registers the first logical device and the second logical device representing the first device and the second device respectively in the operating system.

16. The non-transitory storage medium according to claim 13, wherein the universal device driver includes at least one of a printing function, a scanning function, and a faxing function.

17. A non-transitory storage medium storing therein a universal device driver that is configured to be executed in an information processing apparatus using an operating system controllable by a first user device of a first user and a second user device of the first user, wherein the information processing apparatus is configured to communicate with a first device and a second device, and the universal device driver, when executed, causes the information processing apparatus to:
- receive a first request from the first user device, the first request representing designation of the first device;
- after receiving the first request from the first user device, register a first logical device associated with the first device represented in the first request from the first user device; and
- set the registered first logical device as a default remote device for the first user device in the operating system:
- receive a second request from the second user device, the second request representing designation of the second device;
- after receiving the second request from the second user device, register the second device as a second logical device associated with the second device represented in the second request from the second user device; and
- set the registered second logical device as a default remote device for the second user device in the operating system.

18. The non-transitory storage medium according to claim 17, wherein the universal device driver includes at least one of a printing function, a scanning function, and a faxing function.

* * * * *

UNITED STATES PATENT AND TRADEMARK OFFICE
CERTIFICATE OF CORRECTION

PATENT NO. : 8,836,962 B2
APPLICATION NO. : 13/302433
DATED : September 16, 2014
INVENTOR(S) : Ryo Yasui Page 1 of 1

It is certified that error appears in the above-identified patent and that said Letters Patent is hereby corrected as shown below:

Claims

In Column 18, Claim 13, Line 23:
Please delete "second user" and insert --second user,--

In Column 18, Claim 13, Line 27:
Please delete "for he second" and insert --for the second--

In Column 19, Claim 17, Line 14:
Please delete "operating system:" and insert --operating system;--

Signed and Sealed this
Sixteenth Day of August, 2016

Michelle K. Lee
*Director of the United States Patent and Trademark Office*